United States Patent [19]

Dedolph

[11] 4,035,951
[45] July 19, 1977

[54] CONTAINER OF STABILIZED MEDIA WITH GROWING PLANT THEREIN AND METHOD OF MAKING THE SAME

[75] Inventor: Richard R. Dedolph, Naperville, Ill.

[73] Assignee: Gravi-Mechanics Co., Naperville, Ill.

[21] Appl. No.: 603,755

[22] Filed: Aug. 11, 1975

[51] Int. Cl.$^2$ .............................................. A01G 9/02
[52] U.S. Cl. ........................................ 47/66; 47/67; 47/74; 71/64 A; 260/2.5 R; 264/101
[58] Field of Search ...................... 264/90–91, 264/101; 47/34, 37, 35, 58, 34.11, 1.2; 260/2.5 T; 71/64 T

[56] References Cited

U.S. PATENT DOCUMENTS

| | | | |
|---|---|---|---|
| 2,965,584 | 12/1960 | Elkin | 47/DIG. 7 |
| 3,373,009 | 3/1968 | Pruitt et al. | 47/37 UX |
| 3,472,644 | 10/1969 | Woodside et al. | 47/37 UX |
| 3,608,238 | 9/1971 | Reuter | 47/1.2 |
| 3,799,755 | 3/1974 | Rack | 47/37 UX |
| 3,812,619 | 5/1974 | Wood et al. | 47/58 |
| 3,834,072 | 9/1974 | Rack | 47/37 |
| 3,878,279 | 4/1975 | Sorrells | 264/101 X |
| 3,882,634 | 5/1975 | Dedolph | 47/1.2 |
| 3,899,850 | 8/1975 | Glück et al. | 47/37 |

FOREIGN PATENT DOCUMENTS 1,949,473  4/1971  Germany .................................. 47/1.2

*Primary Examiner*—Robert E. Bagwill
*Attorney, Agent, or Firm*—Prangley, Dithmar, Vogel, Sandler & Stotland

[57] ABSTRACT

A container of stabilized media with a growing plant therein comprising a fluid-tight container open at the upper end, a body of soil mix in the container with a growing plant having the roots thereof in the body of soil mix and having the stalk thereof extending outwardly from the upper surface, and a quantity of synthetic organic plastic resin distributed throughout the body of soil mix and around the roots in an acetone solution, the resin being reacted in situ to form an opencelled hydrophilic polymer binding the body of soil mix into a cohesive mass and to the adjacent inner surfaces of the container and binding the roots in the cohesive mass, the roots being disposed substantially uniformly throughout the adjacent portions of the cohesive mass and the stalk being intimately surrounded by the cohesive mass and extending through the upper surface thereof; there also is disclosed a container wherein the growing plant is disposed in a soil plug that is stabilized by an open-celled hydrophilic polymer; there is also disclosed method of forming such containers of stabilized media with growing plant therein.

48 Claims, 22 Drawing Figures

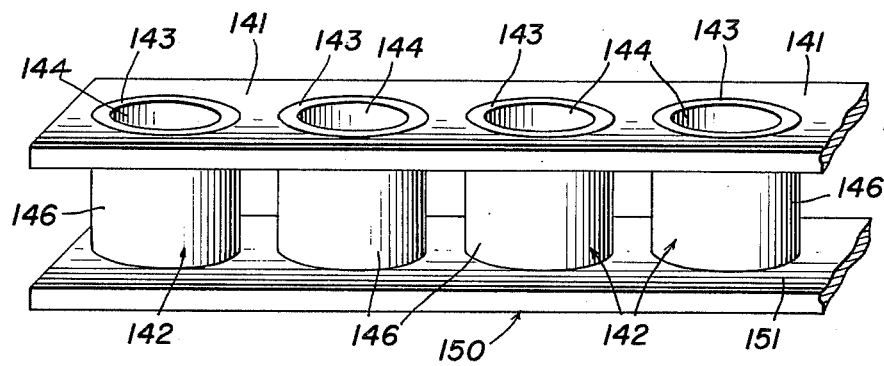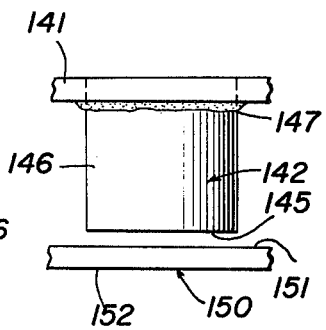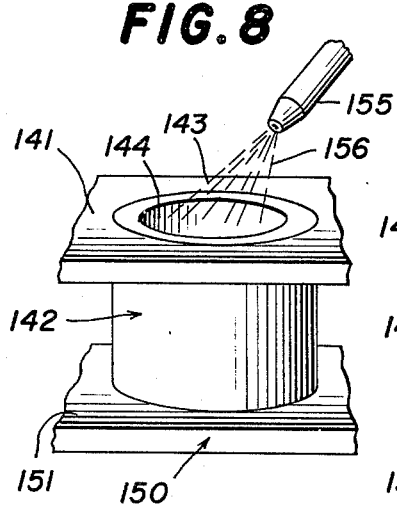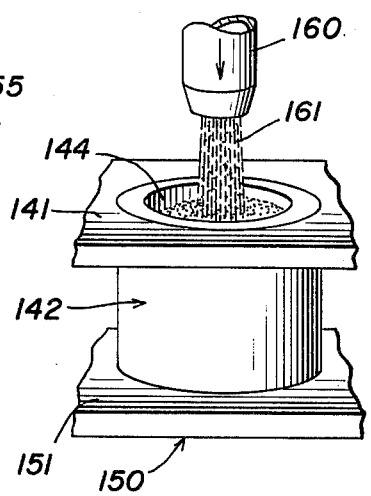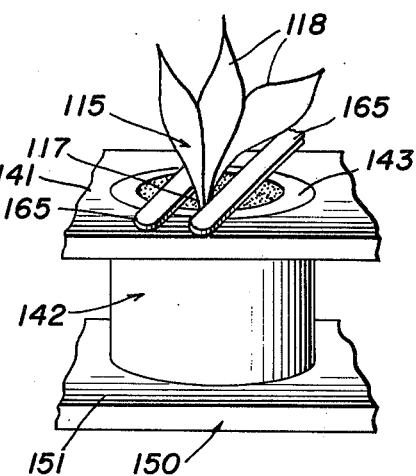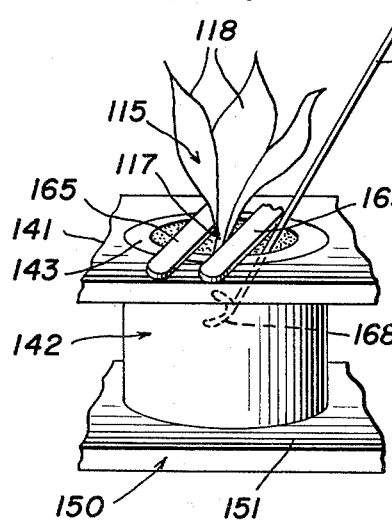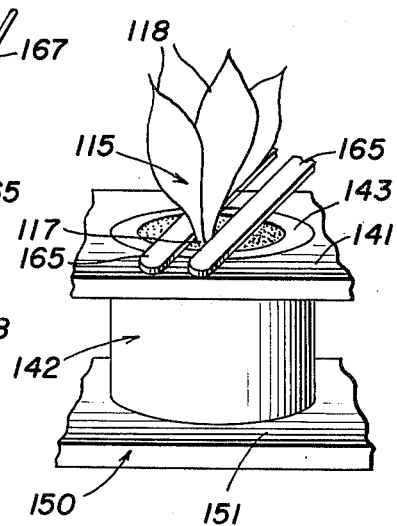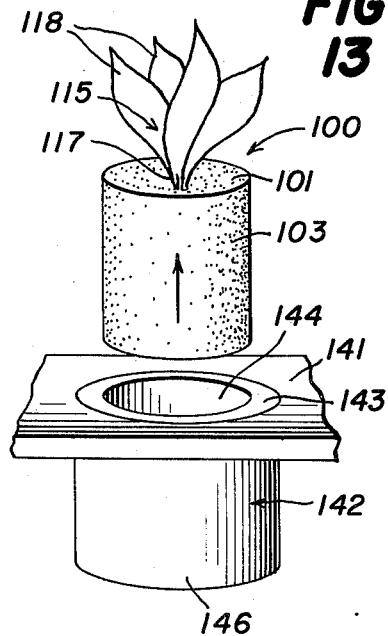

CONTAINER OF STABILIZED MEDIA WITH GROWING PLANT THEREIN AND METHOD OF MAKING THE SAME

BACKGROUND OF THE INVENTION

The present invention relates generally to improvements in growing and merchandising plants, and specifically to the provision of containers having therein a stabilized soil mix with a growing plant in the stabilized soil mix, together with methods of making such items.

Difficulty has been experienced in the merchandising heretofore of containers with growing plants therein, in that the soil has been in a loosely packed condition and great care must be exercised in shipping and storing, as well as subsequent handling, of such containers.

SUMMARY OF THE INVENTION

The present invention provides a container of stabilized soil mix, and also such a container with a growing plant therein, together with methods of making such containers of stabilized soil mix and such containers with plants therein.

It is an important object of the present invention to provide a container of stabilized soil mix comprising a container open at the upper end thereof, a body of soil mix in the container, and a quantity of synthetic organic plastic resin distributed throughout the body of soil mix, the quantity of synthetic organic plastic resin being reacted in situ to form an open-celled hydrophilic polymer binding the body of soil mix into a cohesive mass and to the adjacent inner surfaces of the container.

Another object of the invention is to provide a container of stabilized soil mix with a growing plant therein comprising a container open at the upper end thereof, a body of soil mix in the container, a growing plant having the roots thereof in the body of soil mix and having the stalk thereof extending outwardly from the upper surface of the body of soil mix, having a quantity of synthetic organic plastic resin distributed throughout the body of soil mix, the quantity of synthetic organic plastic resin being reacted in situ to form an open-celled hydrophilic polymer binding the body of soil-like material into a cohesive mass and to the adjacent inner surfaces of the container and binding the roots in the cohesive mass, the roots beind disposed substantially uniformly throughout the adjacent portions of the cohesive mass and the stalk being intimately surrounded by the cohesive mass and extending through the upper surface thereof.

In connection with the foregoing object, it is another object of the invention to provide a container of the type set forth wherein the growing plant is in a polymerized soil plug that is in turn disposed in a body of sand that is stabilized by an open-celled hydrophilic polymer to bind the body of sand into a cohesive mass and to the adjacent inner surfaces of the container and to the adjacent outer surfaces of the soil plug.

A further object of the invention is to provide methods of forming containers and containers having growing plants therein as set forth above.

Further features of the invention pertain to the particular arrangement of containers and the soil-like materials therein, and to the particular details of the steps of the method of forming containers of the type set forth, whereby the above outlined and additional operating features thereof are attained.

This invention, both as to its organization and method of operation, together with further features and advantages thereof will best be understood with reference to the following specification taken in connection with the accompanying drawings.

BRIEF DESCRIPTION OF THE DRAWINGS

FIG. 6 is a perspective view of a set of molds for forming the polymerized soil plug that is a part of the container of FIG. 1;

FIG. 7 is an end view from the left of the mold set of FIG. 6;

FIGS. 8-13 illustrate the steps of making of the polymerized soil plug forming a part of the container of FIG. 1;

DESCRIPTION OF THE PREFERRED EMBODIMENTS

Figure 1:
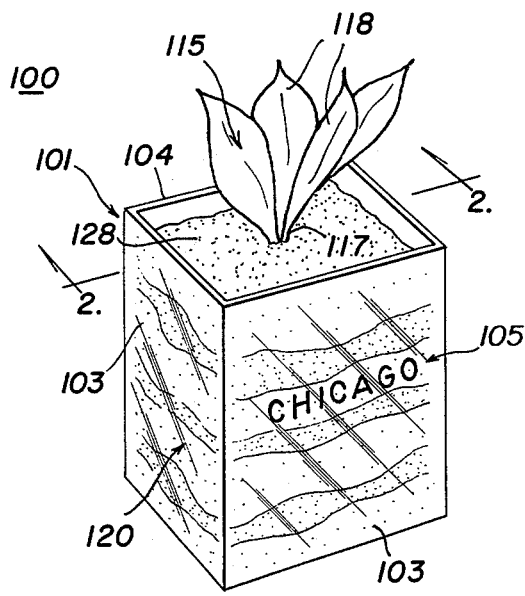
FIG. 1 is a perspective view of a container made in accordance with the embodying the principles of the present invention, the container having a growing plant extending therefrom with the roots disposed in a stabilized mass of soil mix.
Figure 2:
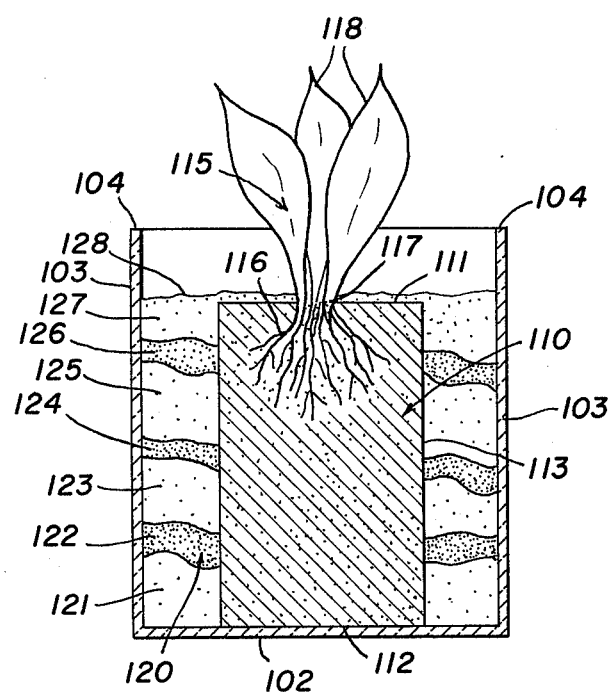
FIG. 2 is a view in vertical section through the soil plug of FIG. 1 along the line 2—2 thereof.

Referring to FIGS. 1 and 2 of the drawings, there is illustrated a potted plant assembly 100 made in accordance with and embodying the principles of the present invention. The potted plant assembly 100 includes a container 101 that is illustrated as being transparent in character, and may be made of plastic or glass. A preferred plastic is a methyl methacrylate plastic which provides good strength, resistance to abrasion and good transparency. The container 101 includes a bottom wall 102 and four side walls 103 terminating in an upper edge 104, the several walls being integrally joined to provide a fluid-tight container 101. There also may be provided on at least one of the side walls 103 an indicia as indicated at 105, the indicia 105 being provided on either the outer surface of the side wall 103 or on the inner surface thereof, and may be in the form of an etching on the surface of the material of the side wall 103, or may be painted thereon, and the like.

Disposed within the container 101 and resting upon the bottom wall 102 thereof is a soil plug 110. The soil plug 110 is generally symmetrical in shape and has a flat top 111, a flat bottom 112 and a cylindrical side wall 113. Molded in the soil plug 110 is a growing plant 115, the plant 115 including roots 116, a stalk 117 and a top or leaves 118. In accordance with the present invention, the roots 116 are distributed in the adjacent portions of the soil plug 110 and are molded therein. The stalk 117 is also molded in the soil plug 110 but extends through the top 111 so that the leaves 118 of the plant 115 are exposed to sunlight in the usual manner.

The soil plug 110 is formed of a body of open-celled hydrophilic polymer having particles of soil mix into a cohesive mass to form the soil plug 110. The preferred polymer is formed of a synthetic organic plastic resin, such as a urethene resin, which provides an open-celled spongelike body extending throughout the soil plug 110. Such an open-celled polymer securely holds the soil mixes in place to prevent loss thereof and to prevent dusting or crumbling thereof, all while providing a good porosity. As a result, the soil plug 110 has a good porosity mintenance capacity, has a good water holding capacity, and the soil-like materials are chosen so as to provide a good ion exchange capacity and a good pH buffering capacity in the soil plug 110, all as will be described more fully hereinafter.

Disposed about the soil plug 110 and essentially surrounding the same is a sand painting generally designated by the numeral 120 and formed of a plurality of layers 121 through 127 that provided a decorative and pleasing effect when viewed through the transparent walls of the container 101. The sand painting 120 terminates in a top surface 128 which only barely covers the top 111 of the soil plug 110.

In accordance with the present invention, the sand within the sand painting 120 is bound into a cohesive mass by an open-celled hydrophilic polymer, the preferred polymer being a synthetic organic plastic resin such as a polyurethane resin. Such an open-celled polymer securely hold the sand of the sand painting 120 in place to prevent movement thereof and subsequent destruction of the sand painting 120.

Figure 3:
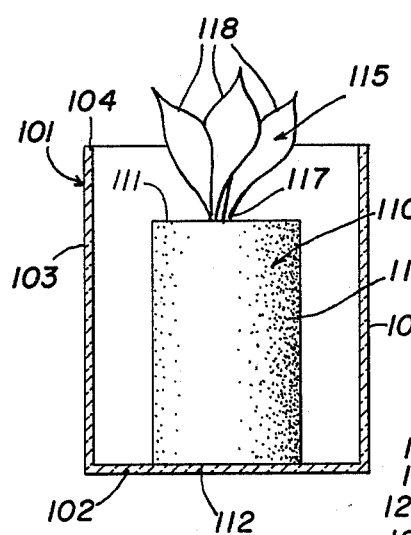
FIGS. 3 to 5 are diagrammatic views in section illustrating the manner of stabilizing the sand around the soil plug in the container of FIG. 1.
Figure 4:
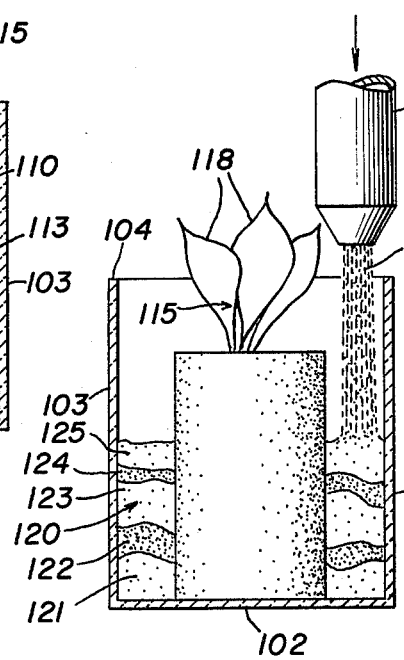
Figure 5:
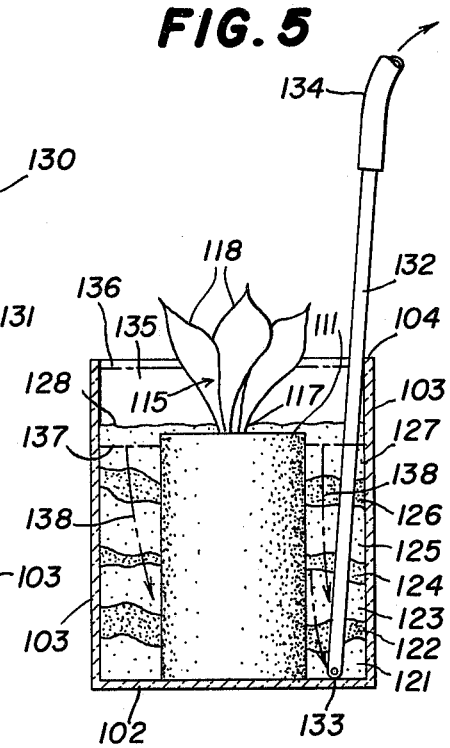

The method of forming and stabilizing the sand painting 120 of the potted plant assembly 100 is diagrammatically illustrated in FIGS. 3, 4 and 5 of the drawings. Referring to FIG. 3, it will be seen that the container 101 is provided in an empty condition and a soil plug 110 is placed therein with the top 111 of the soil plug 110 disposed well below the upper edge 104 of the container 101. Referring to FIG. 4, the artist next applies sand 131 through a nozzle 130 to form the layers 121 through 127. The various sand layers 121 to 127 have different thicknesses, and preferably different colors, or at least contrasting shades and textures, so as to provide a pleasant looking sand painting 120. From FIG. 5 it will be seen that the top surface 128 of the sand painting 120 is disposed just above and just covering the top 111 of the soil plug 110.

The sand painting 120 is stabilized by infiltrating and infusing into the interstices thereof a quantity of synthetic organic plastic resin that is reacted in situ to produce an open-celled hydrophilic polymer. In order to cause the resin solution to be distributed throughout the body of the sand painting 120, a suction probe 132 is utilized to create a vacuum or area of reduced pressure in the bottom of the container 101, thus to draw the resin solution downwardly through the sand painting 120. The suction probe 132 more particularly has an opening 133 in the lower end thereof which is preferably shaped and has a size slightly less than that of the grains of sand forming the sand painting 120. If the sand painting 120 is made of medium sand which has a size approximately 0.25 mm. to about 0.5 mm., then the opening 133 should have a size slightly less than 0.25 mm; on the other hand, if fine sand is used having a size of 0.10 mm. to about 0.25 mm., then the opening 133 should be slightly less than 0.10 mm. The upper end of the suction probe 132 is connected by a flexible connection 134 to a source of reduced pressure. Prior to the insertion of the suction probe 132 in to the sand painting 120, the surface of the suction probe 132 should be coated with a suitable release agent, the preferred release agent comprising lecithin. The lecithin is preferably applied to an alcohol-water solution, 50 grams of lecithin being dissolved in 500 ml. of water, after which 25 ml. of isopropyl alcohol are added to provide the release agent solution. Methyl alcohol, ethyl alcohol and acetone may be utilized in lieu of the isoporpyl alcohol in the solution. The release agent solution may be applied to the suction probe 132 by spraying, brushing, dipping or the like, after which the solution is allowed to dry, thereby leaving a thin film of lecithin as a release agent on the surfaces of the suction probe 132.

In a separate container there are mixed 89.4 parts by weight of water and 10.6 parts by weight of a polyurethane resin prepolymer solution sold by the 3M Company under the designation "XB-2382", the prepolymer solution being a reaction product of toluene diisocyanate and a polyester having unreacted hydroxyl groups thereon such as polyoxy-ethylene diol, 66 parts by weight of the solids being dissolved in 34 parts by weight of acetone. Therefore, in the 10.6 parts by weight of the prepolymer resin solution, 7 parts by weight are resin formers or prepolymer and 3.6 parts by weight are acetone. Further details of the prepolymer are set forth in U.S. Pat. No. 3,805,532 (particularly EXAMPLE 1) and the disclosure thereof is incorporated herein by reference.

When the resin or prepolymer solution and the water are mixed, a milky colloidal dispersion is formed, this colloidal dispersion being identified as a stabilizing resin solution 135 in FIG. 5. From FIG. 5 it will be seen that solution 135 is poured onto the top surface 128 of the sand painting 120 and up to a point just below the upper edge 104 of the container 101. The solution 135 forms an air-tight seal with the inner surfaces of the container 101, and thereafter a vacuum is applied through the suction probe 132, this drawing the solution 135 downwardly into the sand painting 120 as is diagrammatically illustrated by the arrows 138. The advancing lower surface of the resin solution 135 can be visually observed progressing downwardly through the sand painting, that surface being designated by the numeral 137 in FIG. 5. Just before the solution 135 above the top surface 138 is exhausted, additional solution is added until the entire sand painting 120 has been infiltrated by the resin solution 135. At that point the suction probe 132 is promptly removed, thus to complete the potted plant assembly 100.

The resin forming ingredients in the solution 135 react in the presence of the water therein to provide a polyurethane resin accompanied by the evolution of carbon dioxide gas, thereby to provide an open-celled hydrophilic polymer as the reaction product. The polymer thus formed permeates the interstices in the sand painting 120 and forms an open-celled network of polyurethane resin. The excess water and the carbon dioxide gas generated during the polymer forming reaction are quickly withdrawn by the suction probe 132, and as a consequence, there is very little foaming of the resin product, other than that required to keep it open-celled and porous. The resultant polymer binds the grains of the sand painting 120 into a cohesive mass, and further secures the resultant cohesive mass to the adjacent inner surfaces of the container 101 and to the adjacent outer surfaces of the soil plug 110.

The temperature at which the resin infusion or infiltration process is carried may be varied from about 1° C. to about 20° C, the reaction time being inversely proportional to the temperature, i.e., the reaction time being approximately ½ minute at 20° C. and from about 10 minutes to even as much as 20 minutes at 1° C. The weight of polymer utilized in the colloidal dispersion may vary from about 1% by weight to about 10% by weight, a preferred quantity in the example given being 7% by weight.

In one preferred form of a potted plant assembly 100, the dimensions of the container 101 are approximately 2¼ inches by 2¼ inches at the bottom wall 102 and the height of the container is 2½ inches. A typical soil plug 110 has a diameter of 1½ inches and a height of 2 inches, whereby there is a ½ inch distance between the top 111 of the soil plug 110 and the upper edge 104 of the container 101. For such a system, approximately 30 ml. of solution 135 is needed to wet all of the sand painting 120, but about 60 ml. of solution 135 is utilized fully to infiltrate the sand painting 120. As a result, slightly more than 2% by weight of polyurethane polymer is provided in the sand painting 120 to stabilize the sand painting 120. It will be appreciated that slightly less polyurethane polymer may be utilized, and up to as much as 4% by weight of polyurethane resin may be so utilized. If too much polymer is provided in the solution 135, the solution 135 foams substantially at the top of the sand painting 120 and disturbs or even destroys the sand painting 120. The resulting potted plant assembly 100 is unsightly and of no value in the market place.

Referring to FIGS. 6 to 13 of the drawings, the molding apparatus 140 for forming the polymerized soil plug 110 with a growing plant 115 therein will be described in detail. The molding apparatus 140 includes a carrier 141 in the form of an elongated essentially rigid strip having a plurality of openings therein into which are inserted the ends of a plurality of molds 142. The upper ends or top surfaces 143 of the molds 142 are positioned flush with the upper surface of the carrier 141 and are secured thereto as at 147 by any suitable means, such as an adhesive. The openings in the carrier 141 are circular and the molds 142 are cylindrical and are sized to just fit within the openings in the carrier 141. The molds 142 have an inner molding surface 144 and a bottom surface 145 as well as an outer surface 146. Cooperating with the bottom surfaces 145 of the molds 142 is a bottom plate 150 having a top surface 151 and a bottom surface 152, the top suface 151 being smooth and cooperating with the bottom surfaces 145 of the molds 142 temporarily and releasably the close the lower ends of the molds 142 during the molding operation.

In carrying out the molding method of the present invention, a resin release agent is first sprayed upon the surfaces of the molding apparatus 140 and which may come in contact with the resin used to bind the soil mixes into the soil plugs 110. This operation is diagrammatically illustrated in FIG. 8 of the drawings, wherein a spray nozzle 155 is shown spraying a stream 156 of release agent onto the inner surfaces 144 of the mold 142, and also upon the surfaces 141, 142, 143, 145, and 151, as required. Any suitable release agent may be utilized, but much preferred results are obtained by using a release agent comprising lecithin. The lecithin is preferably applied in the alcohol-water solution described above. Instead of being sprayed upon the appropriate surfaces, the release agent solution may also be applied by brushing, dipping, and the like. After application, the release agent solution is allowed to air dry, thereby to leave a thin film of lecithin as a release agent on the surfaces of the molding apparatus 140.

Referring to FIG. 9 of the drawings, there is diagrammatically illustrated the addition of a quantity of slurry through a nozzle 160 in the form of a stream 161, the slurry stream 161 being applied to fill each mold 142 up to a point spaced a short distance below the top surface 143 thereof. Thereafter the plant 115 is placed in the body of slurry within the mold 142, the plant 115 having its roots 116 disposed in the slurry 161 with the stalk 117 extending downwardly into the slurry and then upwardly above the top surface thereof with the top 118 being held in the proper position by a pair of support fingers 165 which may rest upon the upper surface of the carrier 141. In addition, the roots of the plant 115 are spread and distributed in the adjacent portions of the slurry by use of a stirrer 167 having a U-shaped end 168 thereon, as diagrammatically illustrated in FIG. 11 of the drawings. After the roots have been distributed an the stirrer 167 withdrawn from the slurryl the resin in the slurry is permitted to react in situ and the various parts are left as in FIG. 12 until the slurry has set up to a solid cohesive mass, this requiring from about ½ minute to 10 minutes depending upon the composition of the slurry and the temperature during the reaction. After the slurry has set up to form soil plug 110, the soil 110 with the plant 115 molded therein is removed from the mold 142 by withdrawing the bottom plate 150 to expose the lower open end of the mold 142, after which the soil plug 110 may be pushed upwardly and out of the mold 142 as is diagrammatically illustrated in FIG. 13. The resultant product is a cohesive self supporting polymerized soil plug 110 with the growing plant 115 molded therein, more specifically, the roots 116 of the plant are molded in the soil plug 110 as is the stalk 117, the stalk 117 extending upwardly through the top 111 of the soil plug 110 and supporting the top or leaves 118 as illustrated.

The following is a specific example of a resin and soil mix slurry useful in carrying out the method illustrated in FIGS. 6 to 13.

EXAMPLE 1

A soil mixture is provided including a natural oragnic soil, an agricultural modified mineral, fertilizers, and pH control agents, as follows:

| | | |
|---|---|---|
| Peat soil | 78. | lbs. |
| Vermiculite | 19. | lbs. |
| Bone Meal | 0.5 | lbs. |
| Dolomitic Lime | 0.75 | lb. |
| Fertilizer (5-10-5) | 0.75 | lb. |
| "Mag Amp" Fertilizer | 1. | lb. |
| | 100. | lbs. |

The above described soil mixture was then incorporated into a slurry having the following composition:

| | |
|---|---|
| Soil mixture (50% | 32.7 lbs. |

| | |
|---|---|
| Moisture) | |
| Polyurethane Resin-Forming Solution | 9.6 lbs. |
| Water | 57.7 lbs. |
| | 100.0 lbs. |

The soil mixture and water were thoroughly mixed after which the resin solution was added to provide a slurry, the temperature of the slurry being kept at about 5° C. by supplying a portion of the water as ice. The resultant slurry was utilized as described above with respect to FIGS. 9–13 to form a soil plug 110 having a plant 115 molded therein. The time required from preparation of the slurry to solidification thereof to form the soil plug was about 10 minutes at an ambient temperature of 25° C.

In the soil mixtue of Example 1, the peat soil comprises a relatively undecomposed organic soil which includes more than about 50% by weight of combustible materials. The peat provides physical structure including maintenance of porosity and water holding capacity in the finished soil plug 110. The peat soil also provides an ion exchange capacity and serves as a source of nitrogen as well as pH buffering capacity. The Vermiculite also provides physical structure including porosity and water holding capacity as well as some ion exchange capacity. The Vermiculite is particularly useful in rendering the surfaces of the soil plug 110 water permeable, whereby water applied to the surface of the soil plug 110 pentrates throughout the mass thereof. The bone meal provides a slowly available phosphorus source while the dolomitic lime provides pH control and a slowly available source of calcium and magnesium. The fertilizer (5-10-5) provides an immediate source of nitrogen, phosphorus and potassium, while the "Mag Amp" provides a slowly available source of fertilizer elements. The proportions between the peat and the Vermiculite can be changed while maintaining a useful composition for the soil mixture, all as is understood by those skilled in the art. Likewise the amount of the other ingredients can be varied while providing a suitable soil mixture.

In lieu of the peat soil in Example 1, a muck soil may be utilized, muck soil being an organic soil sufficiently decomposed so that there are less than 50% by weight of combustible materials therein. Synthetic organic soil substitutes also may be provided, and preferably the soil substitutes are composted in the usual manner. In place of the Vermiculite, Perlite may be utilized, the agricultural grade having small particle size being preferred.

In general, any combination of soils, natural and synthetic, together with modified minerals, if desired, is useful provided that the resultant soil mixture exhibits porosity maintenance capacity, water holding capacity, ion exchange capacity and pH buffering capacity. The soil mixture should also be initially resilient and be thoroughly mixed and essentially homogeneous throughout. It will be appreciated that fertilizer elements need not be incorporated into the soil mixture, but may be added thereto in aqueous solution after formation of the soil plug 110 as required during the growth of the plant 115.

The resin solution of Example 1 is a polyurethane prepolymer resin solution sold by the 3M Company under the designation "XB-2382", and is a reaction product of toluene diisocyanate and a polyester having unreacted hydroxyl groups thereon, 66 parts by weight of the solids being dissolved in 34 parts by weight of acetone; therefore in the 9.6 parts by weight of resin solution of Example 1, 6.3 parts by weight are resin formers and 3.3 parts by weight is acetone. The resin forming ingredients react in the presence of water and with water to provide a polyurethane resin accompanied by the evolution of carbon dioxide gas, thereby to provide an open-celled hydrophilic polymer as the reaction product. In the slurry, the resin forming ingredients react throughout the slurry mass so as to incorporate the soil ingredients in an open-celled network of polyurethane resin, thereby to impart to the completed soil plug all of the desirable plant growing characteristics of a good soil, namely, porosity maintenance capacity, water holding capacity, ion exchange capacity and pH buffering capacity.

Other resin-forming systems may be utilized so long as they result in a continuous phase of resin that is open-celled and hydrophilic in character. For example, the various resin foam systems set forth in U.S. Pat. No. 3,373,009 may be utilized, and the disclosure thereof is hereby incorporated herein, provided that the resin formulations are modified to incorporate them into a slurry as specified above with respect to Example 1.

The temperature at which the molding operation can be carried out may be varied from about 5° C. to about 20° C., with the curing time being inversely proportional to the temperature, i.e., the curing time being approximately 10 minutes at 5° C. and approximately ½ minute at 20° C., all providing that the ambient temperature is about 25° C.

In making the slurry of Example 1, the soil mixture is first dispersed in the water, the water being added to the soil mixture until the resultant slurry begins to break, the slurry having a consistency like that of cake batter, whereby it readily flows and fills all areas of an associated mold. Thereafter the polyurethane resin-forming solution is added, the amount of resin-forming solution utilized being such that the resultant soil plug 110, on a dry basis, comprises from about 20% by weight to about 80% by weight of polyurethane resin, and likewise contains from about 20% by weight to about 80% by weight of soil particles. Preferably the ratio between the water and the polyurethane resin-forming solution varies from about 1:1 to about 8:1. If the ratio of water to polymer falls below 1:1, the resultant soil plug has a surface characteristic such that water penetration is poor, and the soil plug also has a very high shrink coefficient when dried. If the ratio between the water and the resin-forming solution is greater than 8:1, the water in the slurry tends to separate out and the resin and soil particles float to the top of the slurry, and the resultant soil plug has voids therein, i.e., is not of uniform consistency throughout the mass thereof. A preferred viscosity of the slurry at the time of molding is in the range from about 100 centipoises to about 200 centipoises.

The resultant soil plug 110 is a polyurethane resin foam forming a continuous phase throughout the soil plug, the foam being spongy, open-celled and hydrophilic in character. The soil particles are dispersed throughout the polyurethane foam, yet water in the polyurethane foam has access to the soil particles so that the soil particles perform the usual soil functions during the growth of plants in the soil plug 110. The soil plug 110 has an apparent density of about 0.2 gms. per cc., and may vary from about 0.18 gms. per cc. to about 0.3 gms. per cc. The soil plug can absorb about three times its weight of water, thereby demonstrating that the soil plug 100 is open-celled and has a substantial volume of voids therein.

Contrary to the expectation of those skilled in the art, the acetone in the slurry of Example 1 does not injure the plant 115 in any respect during the molding thereof into the soil plug 110. Although the acetone is present in substantial quantities, and is highly noticeable in the atmosphere during the molding operation, no toxic effect on the plants 115 has been found in carrying out the process of the present invention to produce the soil plug 110.

Other soils in addition to those discussed above with respect to Example 1 are useful in the invention of the present application. In general, all mineral soils are useful herein and can be suitably bound using the open-celled hydrophilic polymer to bind the soil ingredients into a coherent mass. For example, fine gravels having a size of 1 mm. to 2 mm. are useful, coarse sand having a size of 0.5 mm. to 1.0 mm., medium sand having a particle size of 0.25 mm. to 50 mm., very fine sands having a particle size from 0.10 mm. to 0.25 mm., very fine sands having a particle size of 0.05 mm. to 0.10 mm., silts having a particle size of 0.005 mm. to 0.05 mm., and clays having particle sizes of 0.005 mm. and below are all useful herein.

The synthetic organic soil substitutes are also useful. A first type is that comprised of pine barks, wood shavings, sawdust, redwood chips, peanut hulls, pecan shells, straw, leaves or similar organic materials, provided they are reduced in particle size to dimensions useful as rooting media. All of these materials also are useful if composted, subjected to bacterial reduction, and the like, i.e., composted barks, leaf molds, etc. Also useful are sewage wastes and composted sewage wastes as well as animal manures and composted animal manures. Likewise useful are ground garbage and composted ground garbage, as well as fungal and bacterial residues.

The term "soil mix" is used herein to refer to and mean either a single soil, or a combination of soils, or a mixture in combination of soil or soils with other soil-forming material such as vermiculite and perlite, as well as various fertilizer ingredients.

The following are additional specific examples of soil mixtures and slurries useful in carrying out the present invention.

EXAMPLE 2

The method of Example 1 was utilized but the peat soil and Vermiculite were omitted and in their place was used 97 lbs. of ground spaghum. The resultant soil plug had all of the desirable characteristics of the soil plug 110 formed utilizing the method of Example 1.

EXAMPLE 3

The procedure of Example 1 was utilized, but the soil peat and Vermiculite were omitted and in their place there was used 97 lbs. of ground composted pine bark. The resultant soil plug had all of the advantages and characteristics described above with respect to the soil plug 110 formed utilizing the method of Example 1.

EXAMPLE 4

The following soil mixture was provided:

| Peat | 68 lbs. |
| Vermiculite | 17 lbs. |
| Sewage Sludge | 15 lbs. |
| | 100 lbs. |

The above ingredients were mixed and incorporated into a slurry as described above with respect to Example 1. The resultant soil plug had all of the desirable characteristics and properties described above with respect to the soil plug 110 produced utilizing the method of Example 1. The sewage sludge provides the fertilizers required in the soil plug.

EXAMPLE 5

A soil mixture was provided having the following composition:

| Straw Composted With Sewage Sludge (for 6 months to one year) | 79 lbs. |
| Vermiculite, Agricultural Grade | 20 lbs. |
| Bone Meal | 0.5 lbs. |
| Dolomitic Lime | 0.5 lbs. |
| | 100.0 lbs. |

This mixture was utilized in the same slurry as in Example 1. The resultant soil plug had all of the advantages and properties discussed above with respect to the soil plug 110 produced using the method of Example 1.

EXAMPLE 6

The following soil mixture was provided:

| Peat Soil | 33 lbs. |
| Fine Sand | 33 lbs. |
| Silt Loam Soil | 33 lbs. |
| Fertilizer (5-10-5) | 1 lb. |
| | 100 lbs. |

The soil mixture was utilized in the slurry having the composition of Example 1. The resultant soil plug had all of the desirable properties and characteristics described above with respect to the soil plug 110 formed using the method of Example 1.

EXAMPLE 7

The soil mixture of Example 1 was utilized in a slurry having the following composition:

| Soil Mixture (50% Mixture) | 29.8 lbs. |
| Polyurethane Resin-Forming Solution | 17.5 lbs. |
| Water | 52.7 lbs. |
| | 100.0 lbs. |

The resultant soil plug from Example 7 had all of the desirable characteristics and properties of the soil plug 110 made using the method of Example 1. The resultant soil plug from Example 7 had a lower soil mixture content and a higher resin content on a dry weight basis than the soil plug 110 from Example 1, i.e., the soil plug 110 of Example 1 had a soil mixture content of about 72% on a dry weight basis and a resin content of about 28%, whereas the soil plug from Example 7 had a soil mixture content of about 56% on a dry weight basis and a resin content of about 44%. The acetone concentration in the slurry of Example 7 is about 6% by weight which is higher than the acetone concentration of about 3.3% in the slurry of Example 1. Despite the higher concentration of acetone, there was no deleterious effect upon the growing plant 115 molded into the soil plug from Example 7.

EXAMPLE 8

The soil mixture of Example 1 was mixed with the ingredients indicated to provide the following slurry:

| Soil Mixture (50% Moisture) | 33.5 lbs. |
|---|---|
| Polyurethane Resin-Forming Solution | 7.4 lbs. |
| Water | 59.1 lbs. |
| | 100.0 lbs. |

The soil plug formed from this slurry had all of the desirable properties and characteristics of the soil plug 110 made using the slurry of Example 1. The soil mixture content of the soil plug of Example 8 is about 77% on a dry weight basis and the resin content of the soil plug of Example 8 is about 23%.

EXAMPLE 9

The following ingredients were mixed to form a slurry:

| Soil Mixture (50% Moisture) | 16.6 lbs. |
|---|---|
| Polyurethane Resin-Forming Solution | 41.7 lbs. |
| Water | 41.7 lbs. |
| | 100.0 lbs. |

The slurry of Example 9 was utilized to form a soil plug in accordance with the method of Example 1. The resultant soil plug had the desirable properties and characteristics set forth above with respect to the soil plug 110 of Example 1. The soil mixture content of the soil plug of Example 9 is about 23.3% on a dry weight basis and the resin content of the soil plug of Example 9 is about 76.7% on a dry weight basis.

Figure 14:
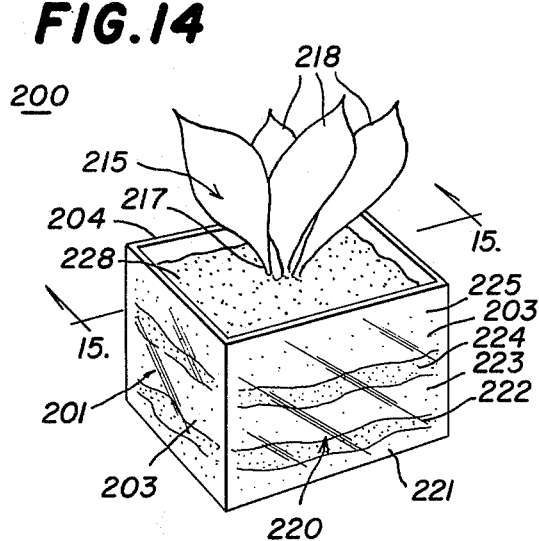
FIG. 14 is a perspective view of a second form of container made in accordance with and embodying the principles of the present invention, the container having a plant growing from a body of stabilized sand therein.
Figure 15:
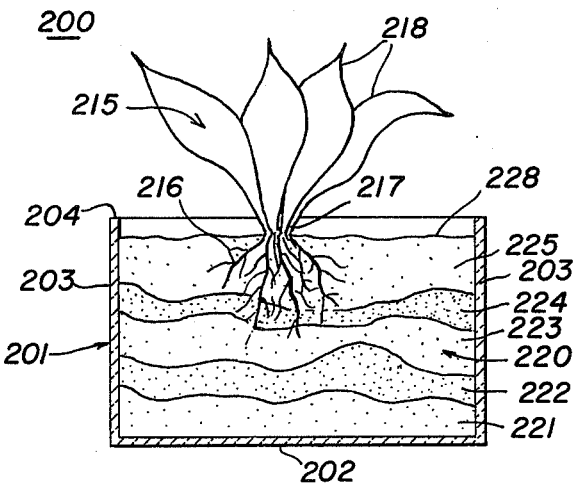
FIG. 15 is a view in vertical section along the line 15—15 of FIG. 14.

There is illustrated in FIGS. 14 and 15 of the drawings a second preferred form of a potted plant assembly 200 made in accordance with and embodying the principles of the present invention. The potted plant assembly 200 includes a container 201 that is illustrated as being transparent in character, and may be made of the same material as the container 101 described above. The container 201 includes a bottom wall 202 and four side walls 203 terminating in an upper edge 204, the several walls being integrally joined to provide a fluid-tight container 201.

Disposed within the container 201 is a sand painting generally designated by the numeral 220 formed of a plurality of layers 221 through 225 that provide a decorative and pleasing effect when viewed through the transparent walls of the container 201. The sand painting 220 terminates in a top surface 228 which is spaced downwardly with respect to the upper edge 204 of the container 201.

Disposed within the sand painting 220 is a growing plant 215, the plant 215 including roots 216, a stalk 217 and a top or leaves 218. In accordance with the present invention, the roots 216 are distributed in the adjacent portions of the sand painting 220 and are molded therein, as will be described more fully hereinafter. The stalk 217 is also molded in the sand painting 220 but extends through the top surface 228 thereof so that the leaves 218 of the plant 215 are exposed to sunlight in the usual manner.

The sand within the sand painting 220 is bound into a cohesive mass by an open-celled hydrophilic polymer, the preferred polymer being a synthetic organic resin such as a polyurethane resin. The open-celled polymer securely holds the sand of the sand painting 220 in place to prevent movement thereof and resultant destruction of the sand painting 220.

Figure 16:
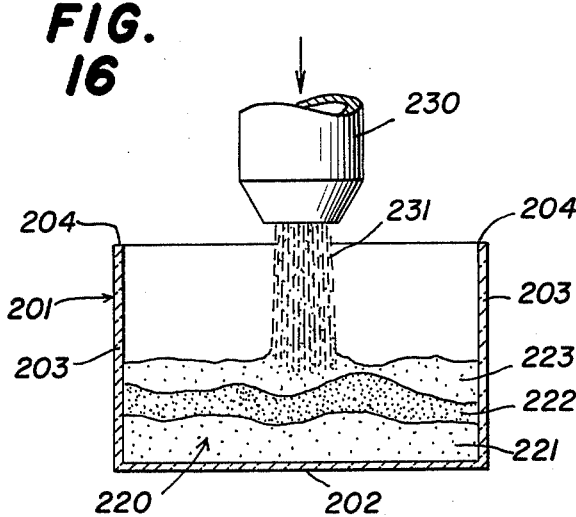
FIGS. 16-19 are diagrammatic views illustrating the method of making the container of FIG. 14.
Figure 17:
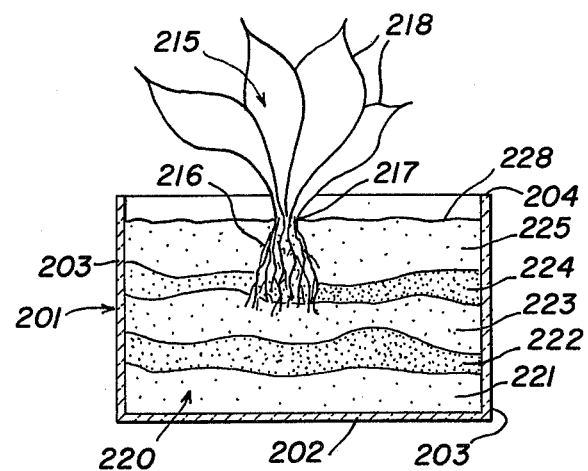
Figure 18:
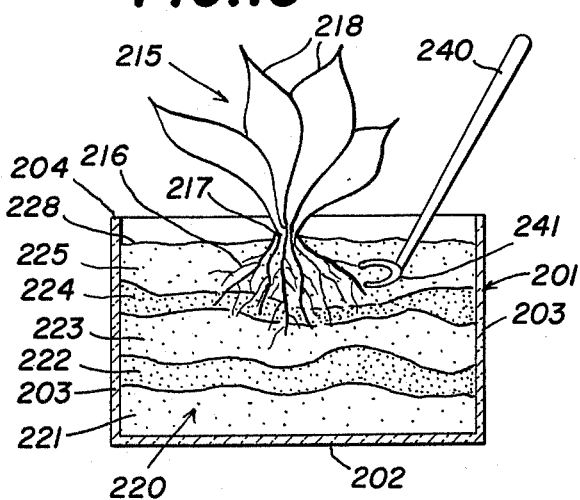

The method of forming the sand painting 220, and the method of planting the growing plant 215 therein, as well as stabilization of the sand painting 220 is diagrammatically illustrated in FIGS. 16–19 of the drawings. Referring first to FIG. 16, the container 201 is initially provided empty, and the artist applies sand 231 through a nozzle 230 to form the layers 221 through 225. The various sand layers 211 to 225 have different thicknesses, and preferably different colors, or at least contrasting shades and textures, so as to provide a pleasant looking sand painting 220. As the sand painting approaches the final top surface 228 thereof, a plant 215 has the roots 216 thereof placed in position and the sand filled therearound, this being diagrammatically illustrated in FIG. 17. If necessary, a stirrer 240 is provided having a U-shaped end 241 that may be used to distribute the roots 216 of the plant 215 through the adjacent portions of the sand painting 220 as is diagrammatically illustrated in FIG. 18.

The sand painting 220 is stabilized by infiltrating and infusing into the interstices thereof a quantity of synthetic organic plastic resin that is reacted in situ to produce an open-celled hydrophilic polymer. In order to cause the resin solution to be distributed throughout the body of the sand painting 220, a suction probe 232 is utilized to create a vacuum or area of reduced pressure in the bottom of the container 201, thus to draw the resin solution downwardly through the sand painting 220. The suction probe 232 more particularly has an opening 233 in the lower end thereof which is preferably shaped and has a size slightly less than that of the particles of sand forming the sand painting 220. If the sand of the sand painting 220 is made of medium sand which has a size of approximately 0.25 mm. to about 0.5 mm., then the opening 233 should have a size slightly less than 0.25 mm.; on the other hand, if fine sand is used having a size of 0.10 mm. to about 0.25 mm., then the opening 233 should be slightly less than 0.10 mm. The upper end of the suction probe 232 is connected by a flexible connection 234 to a source of reduced pressure. Prior to the insertion of the suction probe 232 into the sand painting 220, the surface of the suction probe 232 should be coated with a suitable release agent, such as the release agent comprising lecithin described above with respect to the suction probe 132.

Figure 19:
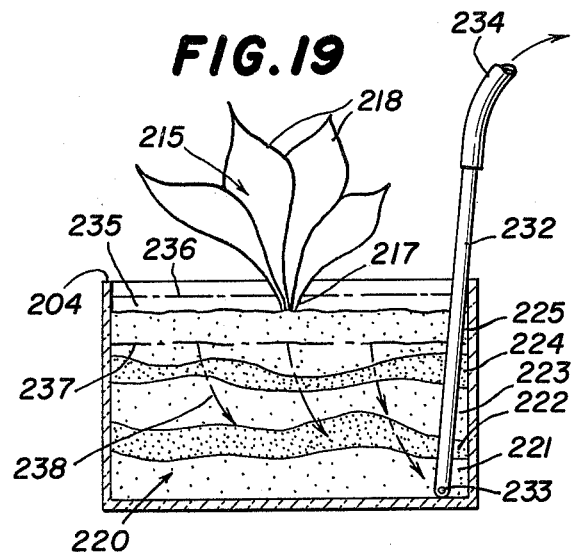

The polyurethane resin solution 235 utilized in FIG. 19 has the same composition and is prepared in the same manner as the resin solution 135 described above with respect to FIG. 5. The manner of drawing the resin 235 through the sand painting 220 is the same as that utilized to draw the resin solution 135 through the sand painting 120 described above with respect to FIG. 5.

Plants particularly useful in the potted plant assembly 200 of FIGS. 14 and 19 are cacti, sansevieria, (illustrated in the drawings) bromeliads, and euphorbias.

Figure 20:
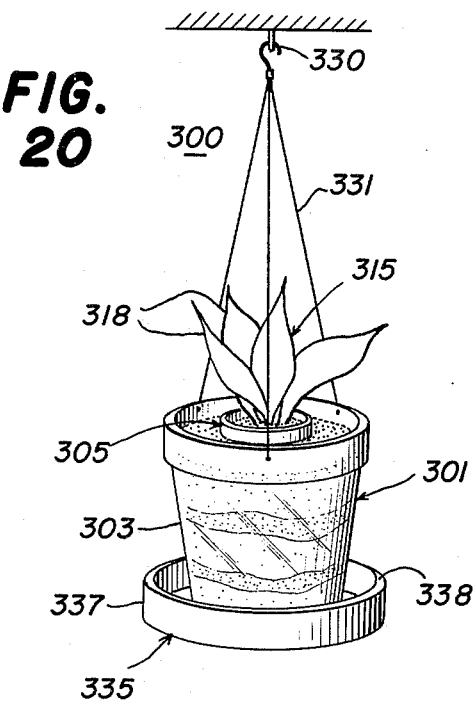
FIG. 20 is a view of a third form of container made in accordance with and embodying the principles of the present invention.
Figure 21:
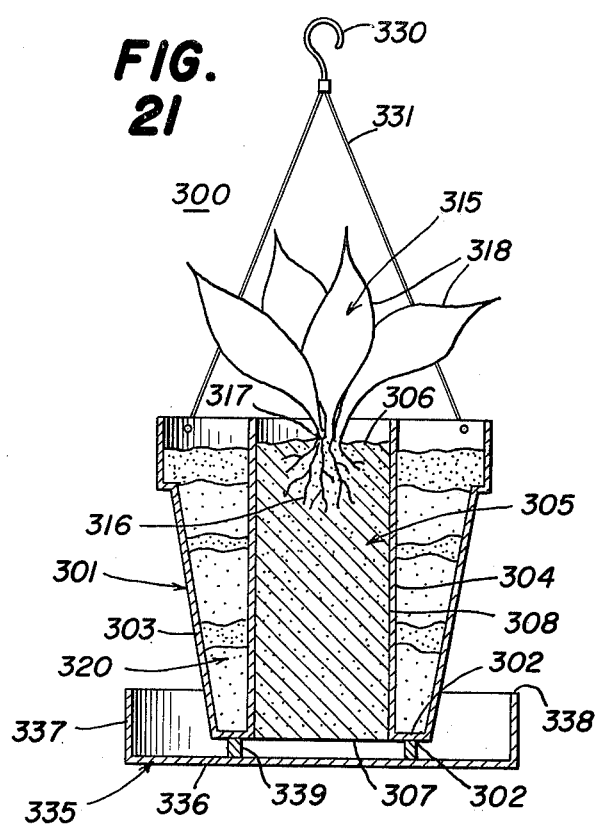
FIG. 21 is a view in vertical section through the container of FIG. 20.

Referring to FIGS. 20 and 21, there is illustrated a third preferred form of a potted plant assembly 300 made in accordance with and embodying the principles of the present invention. The potted plant assembly 300 includes a container 301 which is generally cylindrical in form and includes an annular bottom wall 302, an upwardly extending outer wall 303 integral with the outer edge of the bottom wall 302 and a generally cylindrical inner wall 304 that is integral with the inner edge of the bottom wall 302 and extends upwardly therefrom. The outer wall 303 diverges outwardly from the inner wall 304 to provide a generally conical shape thereby, the walls 303 and 304 forming an annular space therebetween surrounding a cylindrical opening defined by the inner surface of the inner wall 304.

As illustrated, the cylindrical opening formed by the inner surface of the inner wall 304 is shaped and arranged to receive a soil plug 305 therein, the soil plug 305 having a top 306 disposed a short distance downwardly from the upper edge of the inner wall 304, a bottom 307 essentially flush with the bottom wall 302 and a side wall 308 that snugly fits in and is releasably held by the inner surface of the inner wall 304. Planted in the upper portion of the soil plug 305 is a plant 315 having the roots 316 thereof growing in the soil plug 305 and having the stalk 317 extending upwardly through the top 306 and carrying the tops or leaves 318. The soil plug 305 is of the type and is made using the method described above with respect to the soil plug 110 and the plant 115.

The annular space between the opposing surfaces of the outer wall 303 and the inner wall 304 of the container 301 provides an area in which is deposited a sand painting 320. The sand painting 320 is like the sand painting 120 and 220 described above, and is stabilized in the same way as are those sand paintings 120 and 220, whereby the description of the method of forming the sand painting 320 and the method of stabilization thereof will not be repeated. It is pointed out that the upper surface of the sand painting 320 is disposed below the upper edges of the outer wall 303 and the inner wall 304.

As illustrated, the container 301 is provided with a hook 330 connected thereto by three wires 331 so as to support the container 301 on a suitable overhead support. Disposed below the bottom wall 302 of the container 301 is a catch basin 335 including a bottom wall 336 that is generally flat and circular in outline and carrying on the outer edge thereof an integral upstanding side wall 337 having an upper edge 338. The catch basin 335 is secured to the bottom wall 302 by any suitable fastener such as the fastener 339 illustrated. The catch basin 335 serves to receive any excess water that may fall from the soil plug 305.

It will be appreciated that the material of construction of the container 301 is transparent so that the sand painting 320 therein may be seen by a viewer. The preferred materials of construction for the container 301 are the same as those described above with respect to the container 101.

Figure 22:
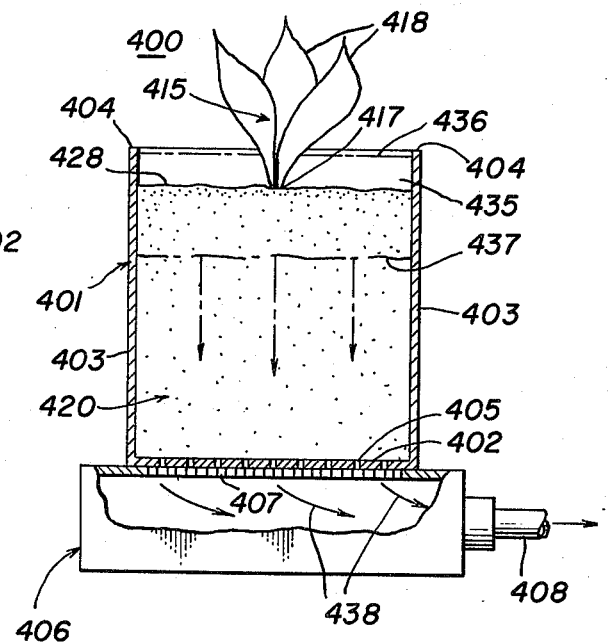
FIG. 22 is a diagrammatic view of a second preferred method of stabilizing the soil mix in a container, all in accordance with the present invention.

Referring to FIG. 22 of the drawings, there is shown another preferred apparatus and method for infiltrating a resin solution into a container having a sand painting therein and carrying a plant in the sand painting. More specifically, there is illustrated another form of potted plant assembly 400 that includes a container 401. The container 401 includes a bottom wall 402 which differs from the other bottom walls described above in that it is provided with a plurality of openings 405 therein, the openings 405 being of the size slightly less than that of the grains of sand forming the sand painting in the potted plant assembly 400. The container 401 also includes four side walls 403 that are formed integral with the bottom wall 402, the side walls 403 terminating in an upper edge 404.

A sand painting 420 is provided in the container 401 and has a top surface 428 disposed a short distance below the upper edge 404. Disposed in the sand painting 420 is a plant 415 having roots (not shown) disposed in the sand painting 420, a stalk 217 extending upwardly through the top surface 428 of the sand painting 420 and the usual top or leaves 418.

There has been provided a vacuum box 406 having a foraminous top 407 upon which the foraminous bottom wall 402 may be placed. The vacuum box 406 has a connection 408 adapted to be connected to a source of vacuum or reduced pressure. In stabilizing the sand of the sand painting 420, a stabilizing resin solution 435 is utilized having a top surface diagrammatically illustrated as 436 and an advancing surface 437 within the body of the sand painting 420. In carrying out the method illustrated in FIG. 22, the sand painting is made as described above with respect to FIGS. 1–5 or FIGS. 16–19, after which the container 401 is placed upon the vacuum box 406. A quantity of the stabilizing resin solution 435 is then poured into the top of the container 401 and the vacuum applied to the vacuum box 406. Water and air and carbon dioxide gas are pulled downwardly through the sand painting 420 as illustrated by the arrows and into the vacuum box 406 as illustrated by the arrows 438. When the advancing surface 437 of the resin solution 435 reaches the bottom wall 402, the container 401 is removed from the suction box and the stabilization process has been completed. The potted plant assembly 400 made in accordance with the method of FIG. 22 has all the desirable properties of the potted plant assembly 100 described above.

Figure 23:
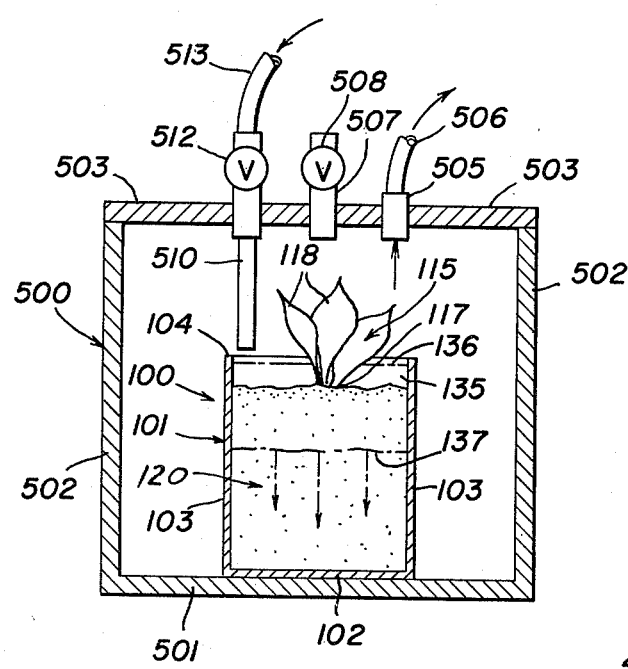
FIG. 23 is a diagrammatic view illustrating a third preferred method of stabilizing the soil mix in a container, all in accordance with the present invention.

Yet another method of infiltrating a stabilizing resin solution into a sand painting is illustrated in FIG. 23 of the drawings. There is shown therein a a vacuum chamber 500 having a bottom wall 501, four upstanding side walls 502 and a removable top wall 503, all joined to form the hermetically sealed chamber. A connection 505 is provided with a coupling 506 to a source of vacuum or area of reduced pressure so as to evacuated the chamber 500 and the contents thereof when desired. A vent port 507 is also provided in the top wall 503, the vent port 507 having a valve 508 so that it can be opened and closed as desired. Finally, a resin solution inlet 510 is also provided in the top wall 503, the inlet 510 being provided with a valve 512 and a connection 513 to a source of stabilizing resin solution.

In utilizing the vacuum chamber 500 of FIG. 23 to stabilize a sand painting in a container 101, the container 101 with the sand painting made and the plant 115 in place is disposed within the vacuum chamber 500, the top wall 503 is applied and sealed so as to hermetically seal the vacuum chamber 500. The vent port valve 508 is closed and a vacuum applied to the chamber 500 through the vacuum connection 505. The pressure within the vacuum chamber 500 is reduced to a pressure corresponding to 30 inches of water, this drawing the air also from the interstices within the sand painting 120 in the container 101. The valve 512 is then opened to feed resin stabilizing solution 135 into the top of the container 101 until the level thereof rises to the line 136. The valve 508 is then opened to admit atmospheric pressure to the interior of the vacuum chamber 500, this action causing positive pressure to be applied to the surface 136 pushing the stabilizing resin solution 135 into the sand painting 120. Solution 135 is added through the valve 512 and the inlet 510 until the advancing surface 137 of the resin solution reaches the bottom wall 102 of the container 101.

The potted plant assembly 100 made utilizing the apparatus and method of FIG. 23 has all of the desirable properties and characteristics of the potted plant assembly 100 described above. The pressure to which the vacuum chamber 500 is evacuated may be as low as 5 inches of water and as high as 50 inches of water. The resin concentration and the temperature of the resin solution are preferably the same as those described above with respect to the infiltration method of FIGS. 3 and 5 and FIGS. 16 and 19.

While there have been described what are at present considered to be certain preferred embodiments of the invention, it will be understood that various modifications may be made therein, and it is intended to cover in the appended claims all such modifications that fall within the true spirit and scope of the invention.

What is claimed is:

1. A container of stabilized soil mix comprising a fluid-tight container open at the upper end thereof, a body of soil mix in said container, and a quantity of foam-forming synthetic organic plastic resin distributed throughout said body of soil mix, said quanity of synthetic organic plastic resin being reacted in situ to form an open-celled hydrophilic polymer binding said body of soil mix into a cohesive mass and to the adjacent inner surfaces of said container, said soil mix comprising at least 96% by weight of said cohesive mass.

2. The container of stabilized soil mix set forth in claim 1, wherein said container is formed of plastic.

3. The container of stabilized soil mix set forth in claim 1, wherein said container is transparent.

4. The container of stabilized soil mix set forth in claim 1, wherein said soil mix is sand.

5. The container of stabilized soil mix set forth in claim 1, wherein said container is transparent, and said soil mix is a sand disposed in said transparent container in an artistic design to provide a sand painting.

6. The container of stabilized soil mix set forth in claim 1, wherein said container has an idicia thereon visible to an observer.

7. The container of stabilized soil mix set forth in claim 1, wherein said cohesive mass is provided with an opening in the center thereof to receive a soil plug.

8. The container of stabilized soil mix set forth in claim 7, and further including a liner for said opening affixed to said container.

9. The container of stabilized soil mix set forth in claim 8, wherein said liner is integral with said container.

10. The container of stabilized soil mix set forth in claim 1, wherein said synthetic organic plastic resin comprises from about 2% to about 4% by weight of said body of soil mix.

11. The container of stabilized soil mix set forth in claim 1, wherein said synthetic organic plastic resin is a polyurethane resin.

12. The container of stabilized soil mix set forth in claim 1, wherein said synthetic organic plastic resin is a reaction product of toluene diisocyanate with a polyester having unreacted hydroxyl groups thereon and water.

13. A container of stabilized soil mix with a growing plant therein comprising a fluid-tight container open at the upper end thereof, a body of soil mix in said container, a growing plant having the roots thereof in said body of soil mix and having the stalk thereof extending outwardly from the upper surface of said body of soil mix, and a quantity of foam-forming synthetic organic plastic resin distributed throughout said body of soil mix and around said roots, said quantity of synthetic organic plastic resin being reacted in situ to form an open-celled hydrophilic polymer binding said body of soil mix into a cohesive mass and to the adjacent inner surfaces of said container and binding said roots in said cohesive mass, said roots being disposed substantially uniformly throughout the adjacent portions of said cohesive mass and said stalk being intimately surrounded by said cohesive mass and extending through the upper surface thereof.

14. The container of stabilized soil mix set forth in claim 13, wherein said body of soil mix has a porosity maintenance capacity and a water holding capacity and an ion exchange capacity and a pH buffering capacity.

15. The container of stabilized soil mix set forth in claim 13, wherein said soil mix includes a fertilizer source of nitrogen, phosphorus and potassium.

16. The container of stabilized soil mix set forth in claim 13, wherein said body of soil mix is a mineral soil.

17. The container of stabilized soil mix set forth in claim 13, wherein said soil mix is a mixture of a natural organic soil and an agricultural modified mineral selected from the group consisting of Perlite and Vermiculite.

18. The container of stabilized soil mix set forth in claim 13, wherein said soil mix is a synthetic organic soil substitute.

19. The container of stabilized soil mix set forth in claim 13, wherein said body of soil mix is a sand, and said growing plant is selected from the group consisting of cacti, euphorbia, sansevieria, and bromeliads.

20. A container of stabilized sand with a growing plant therein comprising a fluid-tight container open at the upper end thereof, a polymerized soil plug disposed in said container and including a body of soil mix, a growing plant having the roots thereof in said body of soil mix and having the stalk thereof extending outwardly from one surface of said body of soil mix, a first quantity of foam-forming synthetic organic plastic resin distributed throughout said body of soil mix, said first quantity of synthetic organic plastic resin being reacted in situ to form an open-celled hydrophilic polymer binding said body of soil mix into a plug and binding said roots in said plug, said roots being distributed substantially uniformly throughout the adjacent portions of said plug and said stalk being intimately surrounded by said plug, a body of sand in said container and substantially surrounding said soil plug, and a second quantity of foam-forming synthetic organic plastic resin distributed throughout said body of sand and around said soil plug, said second quantity of synthetic organic resin being reacted in situ to form an open-celled hydrophilic polymer binding said body of sand into a cohesive mass and of the adjacent inner surfaces of said container and to the adjacent outer surfaces of said soil plug.

21. The container of stabilized sand set forth in claim 20, wherein said second quantity of synthetic organic plastic resin comprises from about 2% to about 4% by weight of said body of sand.

22. The container of stabilized sand set forth in claim 20, wherein said second quantity of synthetic organic plastic resin is a polyurethane resin.

23. The container of stabilized sand set forth in claim 20, wherein said second quantity of synthetic organic plastic resin is a reaction product of toluene diisocyanate with a polyester having unreacted hydroxyl groups thereon and water.

24. A method of making a container of stabilized soil mix comprising the steps of providing a fluid-tight container open at the upper end thereof, placing a body of soil mix in said container, distributing a quantity of foam-forming synthetic organic plastic resin in solution throughout said body of soil mix, and reacting said synthetic organic plastic resin in situ to form an open-celled hydrophilic polymer binding said body of soil mix into a cohesive mass and to the adjacent inner surfaces of said container, said soil mix comprising at least 96% by weight of said cohesive mass.

25. The method of making a container of stabilized soil mix set forth in claim 24, wherein said quantity of synthetic organic plastic resin is distributed in said soil mix before placing the said soil mix in said container.

26. The method of making a container of stabilized soil mix set forth in claim 24, wherein said quantity of synthetic organic plastic resin is distributed in said soil mix after placement of said soil mix in said container.

27. The method of making a container of stabilized soil mix set forth in claim 24, wherein said synthetic organic plastic resin comprises from about 2% to 4% by weight of said soil mix.

28. The method of making a container of stabilized soil mix set forth in claim 24, wherein said synthetic organic plastic resin is a polyurethane resin.

29. The method of making a container of stabilized soil mix set forth in claim 24, wherein said synthetic organic plastic resin is a reaction product of toluene diisocyanate with a polyester having unreacted hydroxyl groups thereon and water.

30. The method of making a container of stabilized soil mix set forth in claim 24, and further comprising the steps of providing an opening in the center of said body of soil mix to receive a soil plug therein.

31. A method of making a container of stabilized soil mix with a growing plant therein comprising the steps of providing a fluid-tight container open at the upper end thereof, placing a body of soil mix in said container with the upper surface of said body of soil mix disposed below the upper end of said container, placing the roots of a growing plant in said body of soil mix with the stalk thereof extending out from said upper surface of said body of soil mix, providing a layer of a dispersion in water of a foam-forming synthetic organic plastic resin covering said upper surface of said body of soil mix and forming a liquid seal across the upper end of said container, applying a vacuum to the lower portion of said container to draw said dispersion downwardly throughout said body of soil mix, and reacting said synthetic organic plastic resin in situ to form an open-celled hydrophilic mass and to the adjacent inner surfaces of said container and binding said roots in said cohesive mass.

32. The method of making a container of stabilized soil mix set forth in claim 31, and further comprising the step of applying additional dispersion of resin to the upper surface of said body of soil mix as said dispersion moves therethrough.

33. The method of making a container of stabilized soil mix set forth in claim 31, wherein the volume of said dispersion is at least 50% of the volume of said soil mix in said container.

34. The method of making a container of stabilized soil mix as set forth in claim 31, wherein said dispersion comprises from about 1% to about 10% by weight of resin-forming material.

35. The method of making a container of stabilized soil mix as set forth in claim 31, wherein said dispersion has a temperature at the time of application to said container in the range from about 1° C to about 202° C.

36. The method of making a container of stabilized soil mix as set forth in claim 31, wherein the vacuum applied to said container is in the range from about 5 inches to about 50 inches of water.

37. The method of making a container of stabilized soil mix set forth in claim 31, wherein the vacuum is applied to said container by a suction probe having an inlet disposed adjacent to the bottom of said container and in communication with said body of soil mix.

38. The method of making a container of stabilized soil mix set forth in claim 31, wherein said container has a foraminous wall at the bottom thereof, and the vacuum is applied to said container through said foraminous wall.

39. The method of making a container of stabilized soil mix set forth in claim 31, and further comprises the step of distributing the roots of the growing plant in the soil mix.

40. A method of making a container of stabilized sand with a growing plant therein comprising the steps of providing a fluid-tight container open at the upper end thereof, placing a soil plug with a growing plant therein in said container, placing a body of sand in said container around said soil plug with the upper surface of said body of sand disposed below the upper end of said container, providing a layer of a dispersion in water of a foam-forming synthetic organic resin covering said body of sand and forming a liquid seal across the upper end of said container, applying a vacuum to the lower portion of said container to draw said dispersion downwardly throughout said body of sand, and reacting said synthetic organic plastic resin in situ to form an open-celled hydrophilic polymer binding said body of sand into a cohesive mass and to the adjacent inner surfaces of said container and to the adjacent outer surfaces of said soil plug.

41. The method of making a container of stabilized sand as set forth in claim 40, and further comprising the step of applying additional dispersion of resin to the upper surface of said body of soil mix as said dispersion moves therethrough.

42. The method of making a container of stabilized sand set forth in claim 40, wherein the volume of said dispersion is at least 50% of the volume of said soil mix in said container.

43. The method of making a container of stabilized sand as set forth in claim 40, wherein said dispersion comprises from about 1% to about 10% by weight of resin-forming material.

44. The method of making a container of stabilized sand as set forth in claim 40, wherein said dispersion has a temperature at the time of application to said container in the range from about 1° C. to about 20° C.

45. The method of making a container of stabilized sand as set forth in claim 40, wherein the vacuum applied to said container is in the range from about 5 inches to about 50 inches of water.

46. The method of making a container of stabilized sand as set forth in claim 40, wherein the vacuum is applied to said container by a suction probe having an inlet disposed adjacent to the bottom of said container and in communication with said body of soil mix.

47. The method of making a container of stabilized sand as set forth in claim 40, wherein said container has a foraminous wall at the bottom thereof, and the vacuum is applied to said container through said foraminous wall.

48. The method of making a container of stabilized sand as set forth in claim 40, and further comprises the step of distributing the roots of the growing plant in the soil mix.

* * * * *